May 25, 1937.     E. H. THOMPSON     2,081,311
METER AND TIMING MEANS
Filed March 21, 1935     7 Sheets-Sheet 1

Inventor:
Ernest H. Thompson
By: Brown, Jackson, Boettcher & Dienner,
Attys.

May 25, 1937.  E. H. THOMPSON  2,081,311
METER AND TIMING MEANS
Filed March 21, 1935  7 Sheets-Sheet 2

Fig. 4.

Inventor:
Ernest H. Thompson
By: Brown, Jackson, Boettcher & Dienner
Attys.

May 25, 1937.  E. H. THOMPSON  2,081,311
METER AND TIMING MEANS
Filed March 21, 1935  7 Sheets-Sheet 4

Inventor:
Ernest H. Thompson
By: Brown, Jackson, Boettcher & Dienner
Attys.

May 25, 1937.  E. H. THOMPSON  2,081,311
METER AND TIMING MEANS
Filed March 21, 1935  7 Sheets-Sheet 5

Inventor:
Ernest H. Thompson
By: Brown, Jackson, Boettcher & Dienner,
Attys.

May 25, 1937.  E. H. THOMPSON  2,081,311
METER AND TIMING MEANS
Filed March 21, 1935　　7 Sheets-Sheet 6

Fig. 12.

Inventor:
Ernest H. Thompson
By: Brown, Jackson, Boettcher & Dienner,
Attys.

Fig. 13.

Patented May 25, 1937

2,081,311

UNITED STATES PATENT OFFICE 2,081,311

METER AND TIMING MEANS

Ernest H. Thompson, Chicago, Ill., assignor to International Register Company, Chicago, Ill., a corporation of Illinois Application March 21, 1935, Serial No. 12,167

4 Claims. (Cl. 161—23)

This invention relates to meters, and has to do with a meter particularly suitable for use with a mechanism which is sold on the time payment plan, the agreed upon payments being effected by insertion of coins of proper value into the meter, the meter having associated therewith time measuring means in the nature of a clock or chronometer.

The meter of my invention is particularly suitable for use with electric refrigerators, though it may be used to advantage with various mechanisms. One of the objects of my invention is to provide a coin operated meter and associated time measuring means of comparatively simple and compact construction, which is highly efficient and may be produced at relatively low cost. Further objects and advantages will appear from the detail description.

The device of the instant application is similar to the meter disclosed and claimed in my copending application for Meter, filed March 21, 1935, Serial No. 12,166, but in which I have associated with this meter, as part thereof, time measuring means and signal means controlled thereby.

Figure 1:
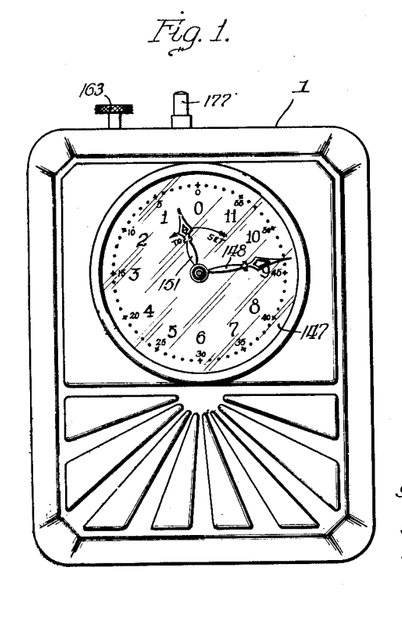
Figure 1 is a front view of a meter and time measuring device embodying my invention, mounted in a suitable casing.
Figure 2:
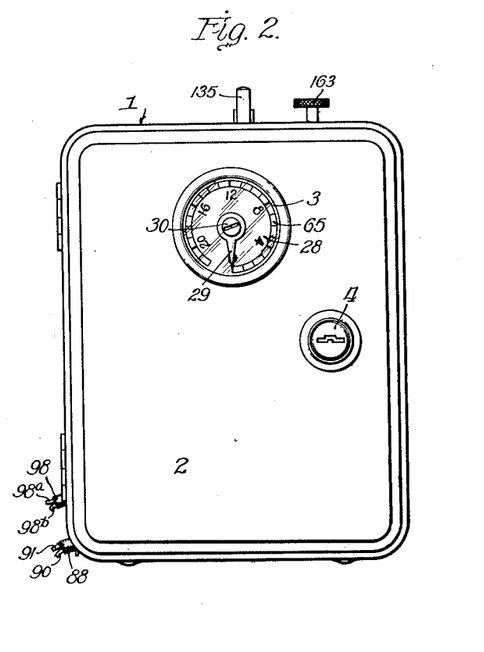
Figure 2 is a rear view of the device.
Figure 3:
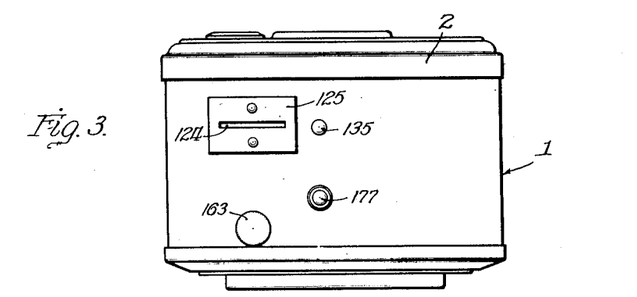
Figure 3 is a plan view of the device.
Figure 4:
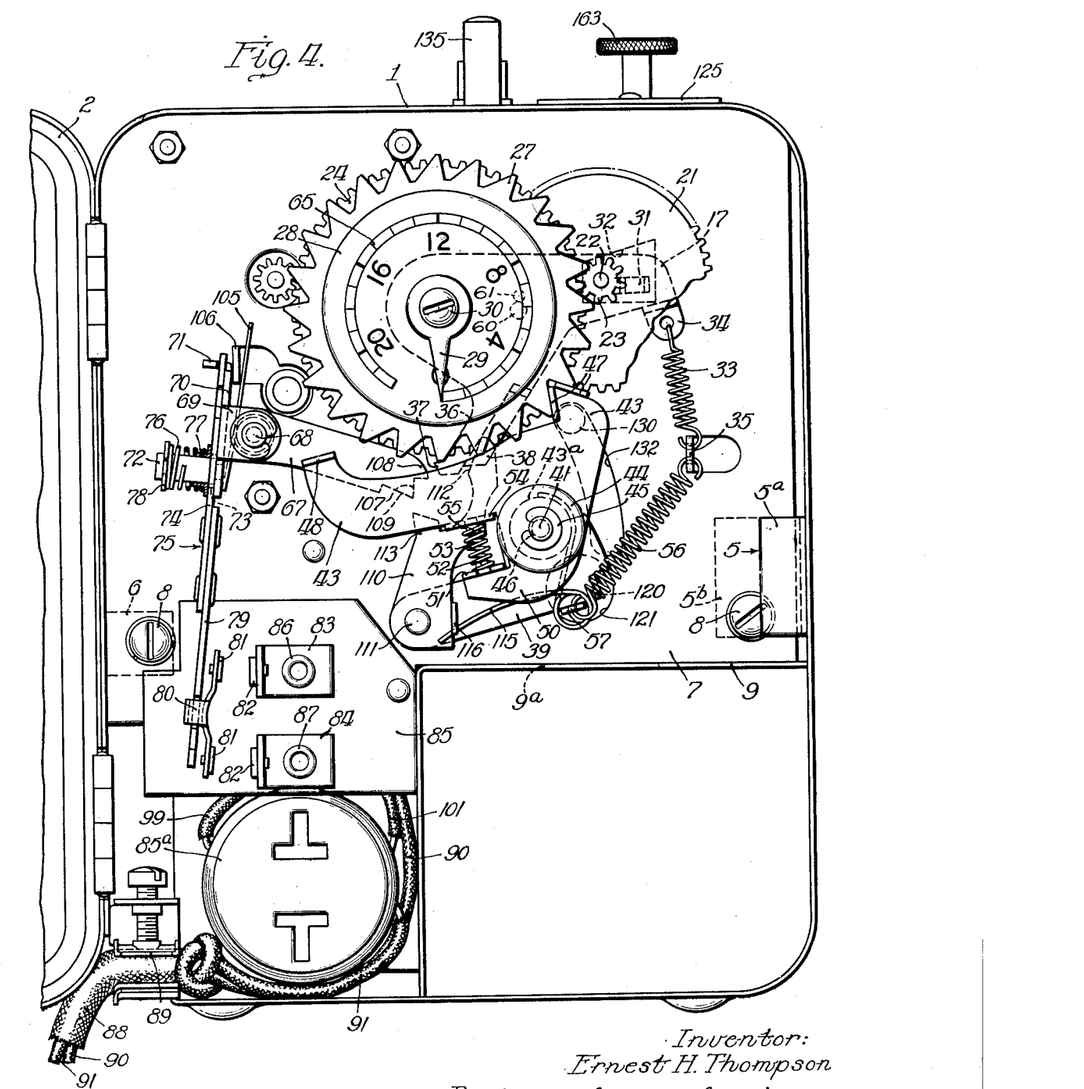
Figure 4 is a back view of the device with the door of the casing opened, on an enlarged scale.
Figure 5:
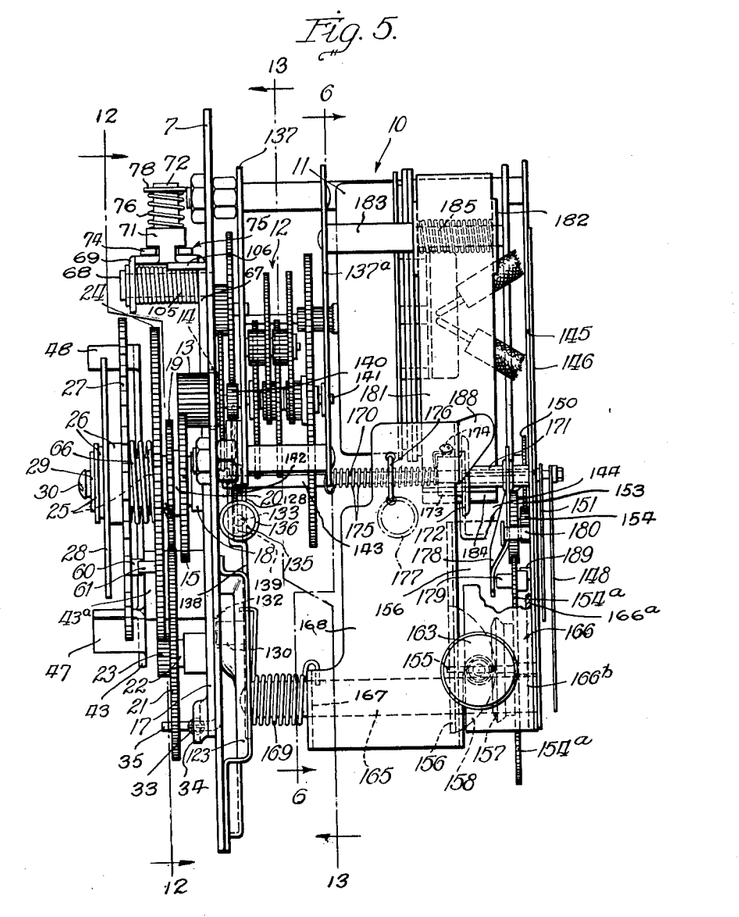
Figure 5 is a plan view of the mechanism of the device removed from the casing, on an enlarged scale.
Figures 6, 7, 11:
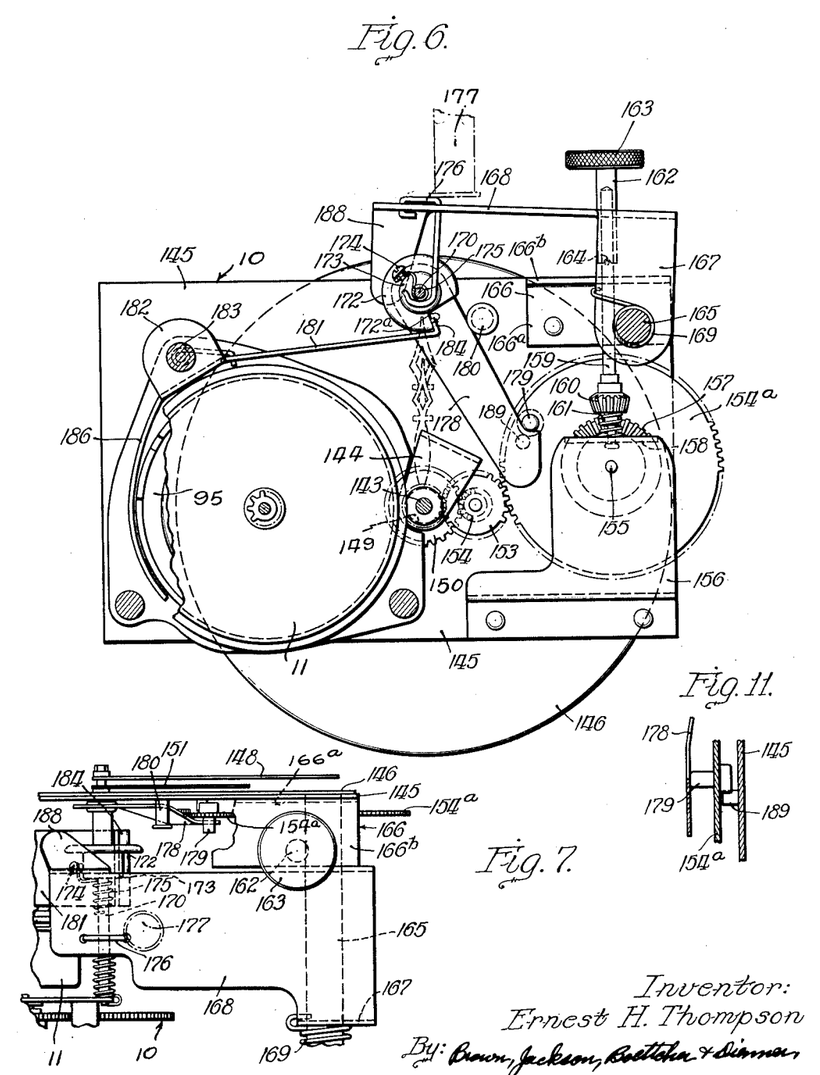
Figure 6 is a section taken substantially on line 6—6 of Figure 5, with the signalling device and associated parts in the positions which they occupy when said device has been released for operation, parts being broken away.
Figure 7 is a fragmentary plan view of the mechanism of Figure 6, parts being broken away.
Figure 11 is a section substantially on line 11—11 of Figure 8.
Figure 8:
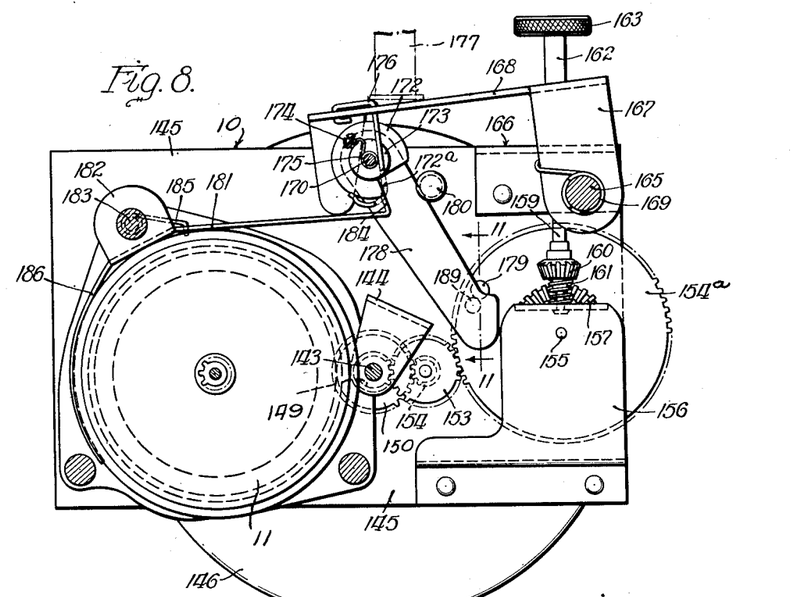
Figure 8 is a view similar to Figure 6, but with the signalling device and associated parts in their relative positions preliminary to setting the timing mechanism for releasing said device for operation at the end of a predetermined time period.
Figure 9:
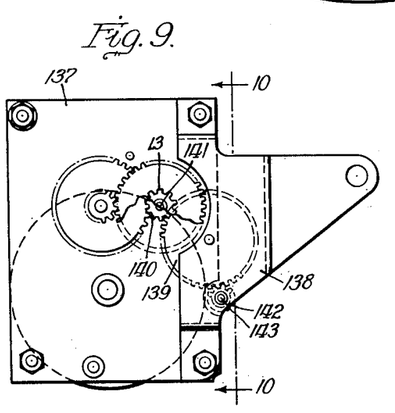
Figure 9 is a back view of the clockwork unit detached from the supporting plate of the meter and coin operated mechanism.
Figure 10:
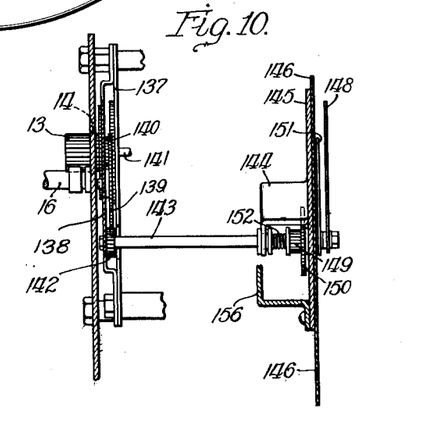
Figure 10 is a sectional view taken substantially on line 10—10 of Figure 9, this view also showing the main supporting plate and the clock dial supporting plate fragmentarily and in section, parts being omitted for clearness of illustration and parts being shown in elevation.
Figure 12:
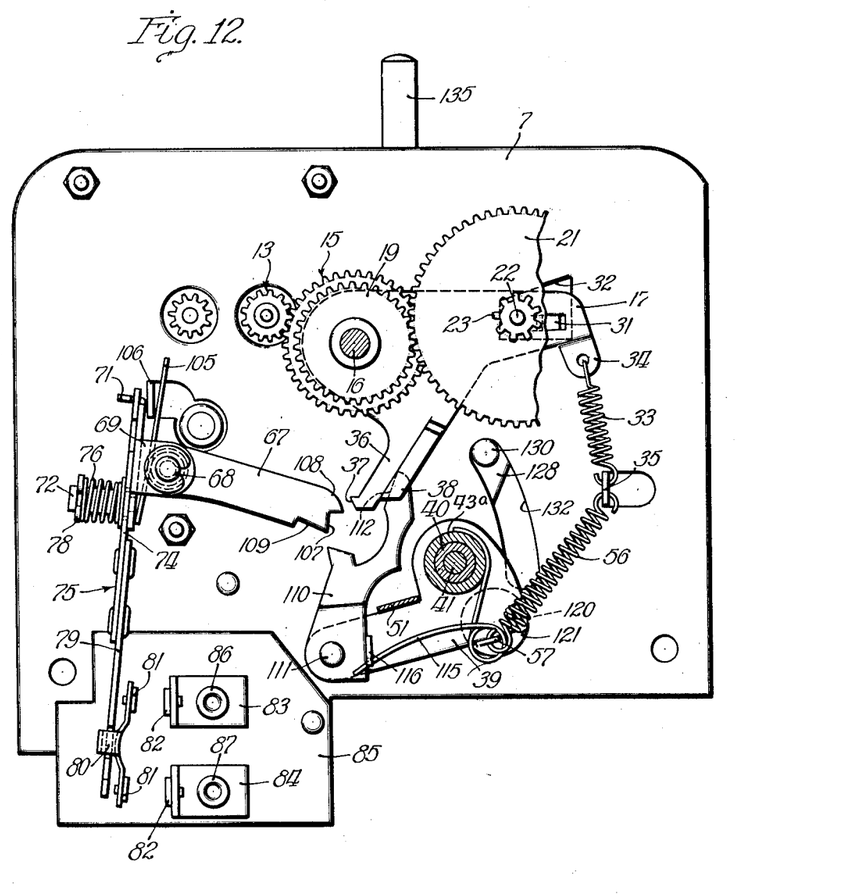
Figure 12 is a sectional view taken substantially on line 12—12 of Figure 5, certain parts being shown in elevation.
Figure 13:
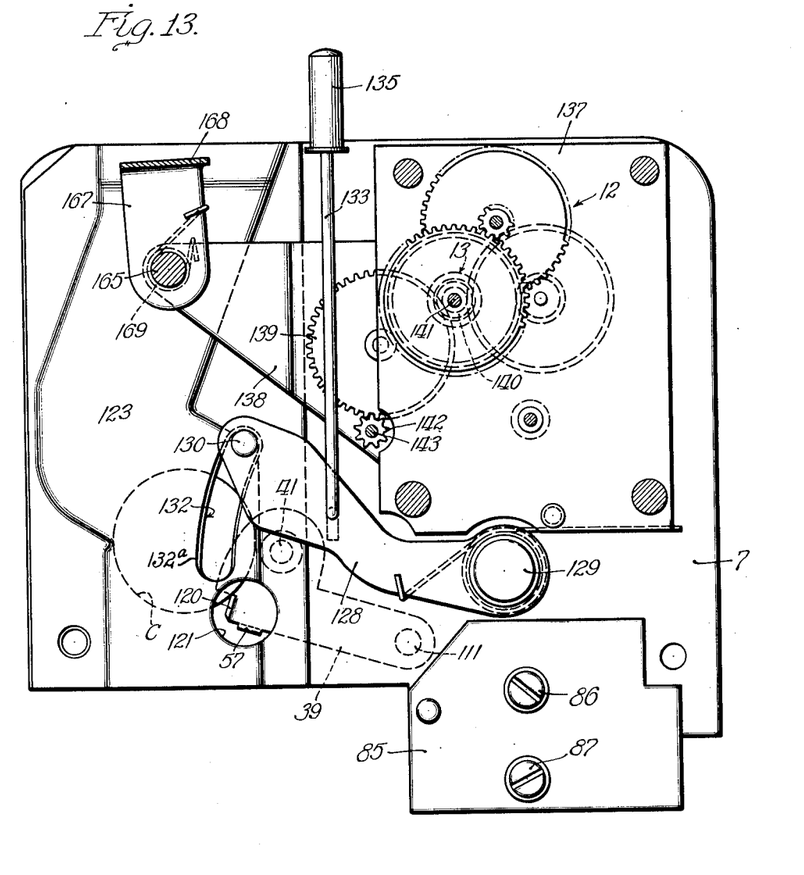
Figure 13 is a sectional view taken substantially on line 13—13 of Figure 5.

In Figures 1 to 3, inclusive, the device is illustrated on a scale less than actual size, in Figures 4 to 8, inclusive, the scale is considerably greater than actual size, for clearness of illustration, and in Figures 9, 10 and 11 the parts shown are drawn to actual size. The mechanism of the device is disposed within a suitable casing 1, the back of which is normally closed by a hingedly mounted door 2 provided with a window 3 (Figure 2) for observation of the dial of the meter mechanism, as will be explained. The door is further provided with a key operated cylinder lock 4 of known type having an element disposed to engage in back of the forward arm 5a of a U-shaped bracket 5 spot-welded or otherwise suitably secured to one side wall of the casing. Inner arm 5b of bracket 5 projects inwardly of casing 1 beyond arm 5a, and a bracket 6 is secured to the inner face of the other side wall of the casing. A supporting plate 7 fits within casing 1 and seats upon bracket 6 and arm 5b of bracket 5, this plate being secured to the brackets by screws 8, or in any other suitable manner. The lower portion of plate 7 is cut away to accommodate a plate 9 of approximately L-shape in edge view, this plate 9 defining, with the adjacent portions of the bottom and side walls of the casing, a coin receptacle which receives the coins inserted into the meter, as will be later described.

A clockwise assembly 10 (Figure 6) is suitably mounted on plate 7 at the back thereof. This assembly comprises a self-starting synchronous motor 11 of known type, which, through a gear train 12, drives a pinion 13 at constant speed. This pinion projects through an opening 14 in plate 7, and the front of the pinion is flush with the front face of a gear 15 with which the pinion meshes. Gear 15 is rotatably mounted on a stub shaft 16 (Figure 10) secured in plate 7, and is disposed in front of a switch control lever 17 mounted for free turning movement on the stub shaft and confined between plate 7 and a slotted lock member 18, of known type, which engages into a circumferential groove in the stub shaft. A gear 19 is secured on hub 20 of gear 15, in front of and spaced from the latter gear. Gear 19 meshes with a gear 21 rotatably mounted on a pin 22 carried by lever 17 and disposed remote from stub shaft 16. A pinion 23, secured to gear 21 at the front face thereof, meshes with a relatively large gear 24, rotatably mounted on stub shaft 16 in front of hub 20 of gears 15 and 19. Gear 21 and pinion 23 are driven in a counterclockwise direction, pinion 23 normally driving gear 24 in a clockwise direction, as viewed in Figure 4.

Gear 24 is provided with a forwardly extending hub 25 on which is rotatably mounted a hub 26 upon which is secured a toothed wheel 27. A suitably graduated dial 28 is secured on the outer end of hub 26, and a pointer 29 is secured on the reduced outer end of hub 25 of gear 24, in front of and adjacent the outer end of hub 26, hubs 25 and 26 being thus held against appreciable relative endwise movement. A retaining member, conveniently a screw 30, is secured in the outer end of stub shaft 16 and overlies the forward end of hub 25, normally holding the latter against movement lengthwise of stub shaft 16 toward the forward or outer end thereof. The gear 24 and wheel 27 and associated parts constitute a setting and controlling assembly normally held upon the stub shaft 16 by screw 30, which assembly can be removed from the stub shaft endwise thereof upon removal of the screw. Normally, gear 24 overlies gear 21, as in Figure 4, and prevents outward movement of the latter on pin 22 while also preventing movement of gears 15 and 19 lengthwise of stub shaft 16 toward the outer or forward end of the latter. By removing the setting and controlling assembly from stub shaft 16, ready access is had to gears 21 and 19 and 15, which may then be removed and replaced with facility. In order to vary the timing of the mechanism, the unit comprising gears 15 and 19, and the unit comprising gear 21 and pinion 23, may be replaced by similar units in which the ratio between gears 19 and 21 is different from the ratio between these gears of the replaced units and of proper value to give the desired timing of the mechanism. After this adjustment has been effected, the controlling and setting assembly is replaced upon stub shaft 16. This provides extremely simple means for adjusting the timing of the mechanism to suit requirements.

Lever 17 is provided, adjacent its free end, with a tongue 31, struck forwardly therefrom and projecting into an opening 32 in plate 7 (Figure 4), this tongue cooperating with the bottom edge of opening 32 for limiting turning movement of the lever 17 in clockwise direction on stub shaft 16. Normally, the lever 17 is held in its extreme position in a clockwise direction about the stub shaft, with tongue 31 in contact with the lower edge of opening 32, by a tension spring 33, the upper end of which is hooked through a tab 34 extending downward from the outer end of lever 17, the lower end of this spring being hooked through a tab 35 struck from plate 7 and projecting rearwardly thereof. Lever 17 is further provided with an arm 36 extending therefrom at an inclination downward and away from the outer end of the lever, the lower end of this arm being shaped to provide an upwardly projecting latch element 37. Arm 36 is provided, at its lower edge, with a rearwardly offset element 38 which forms with plate 7 a pocket for reception of an element of a setting pawl, hereinafter described in detail.

A setting lever 39, shaped as shown in Figure 4, is secured upon the reduced forward end of a sleeve 40, mounted for turning movement on a post 41 secured in plate 7 below arm 36 of lever 17. A timer setting pawl 43, provided with a sleeve 43a, is mounted for turning movement about post 41, on sleeve 40, and is confined between lever 39 and a washer 44 confined between lever 43 and a lock member 45 of known type engaging into a circumferential groove 46 in the post. Setting pawl 43 is provided, at the end thereof adjacent gear 21, with two tabs 47 which project rearward from the pawl and converge toward wheel 27, these tabs defining a tooth element adapted for engagement between the teeth of the wheel. Pawl 43 is further provided, at its other end, with a rearwardly projecting tab 48 disposed to contact the following edges of the teeth of wheel 27, and cooperating with the tooth defined by tabs 47 for imparting clockwise rotation to wheel 27 in the setting of the mechanism for a predetermined time period of operation. Pawl 43 is provided with a stop finger 50 disposed to contact the lower face of a tab 51 projecting rearwardly of lever 39 at the upper edge thereof. The central part of tab 51 is struck upwardly to provide a stud 52 which extends into the lower end of a compression coil spring 53, confined between tab 51 and a tab 54 projecting forwardly from the timer setting pawl 43 at the lower edge thereof. The central portion of tab 54 is struck downward to provide a stud 55 which extends into the upper end portion of spring 53. A tension spring 56 is attached at its upper end to tab 35 of plate 7, and has its lower end hooked through a tab 57 projecting rearwardly from lever 39 at the lower edge thereof. This tension spring normally holds lever 39 in such position that tab 51 thereof contacts the upper edge of finger 50 of the timer setting pawl 43, and retains the latter in such position that the tooth element defined by tabs 47 engages between two adjacent teeth of wheel 27 and locks the latter against rotation in either direction.

Wheel 27 is provided with a pin 60 secured therein and projecting forwardly therefrom. This pin is disposed in advance of, and in the path of travel of, a pin 61 secured to and projecting rearwardly from gear 24, this latter pin traveling clockwise with the gear when the latter is driven. By operation of the timer setting pawl 43, wheel 27 is rotated step by step in a clockwise direction so as to advance pin 60 relative to pin 61, thus predetermining the time period of operation of the mechanism controlled by the meter. Dial 28 turns with wheel 27 so as to move a suitably graduated scale 65 on the front face of the dial beneath pointer 29. Each graduation of this scale corresponds to the rotary movement of wheel 27 during one actuation of the pawl 43, due to insertion of a coin, so that the pointer and the scale indicate the number of coins which have been inserted and also provide means for determining the period of time for which the mechanism can operate before it becomes necessary to insert additional coins, that is, the remaining period of time during which the controlled mechanism is capable of being operated.

A coil spring 66, disposed about hubs 25 and 26, is confined under compression between gear 24 and wheel 27. This spring serves to prevent any objectionable endwise play between the parts of the controlling and setting mechanism, and also provides friction means for retarding rotation of wheel 27 so as to assure proper movement thereof in accordance with the operation of the timer setting pawl 43.

An arm 67 is pivotally mounted on a stud 68 secured in plate 7 and projecting rearwardly therefrom adjacent wheel 27, and at the opposite side thereof from stud 41. Stud 68 passes through arm 67 and through a tab 69 parallel with arm 67 and projecting from the rearward edge of a base plate 70 integral with the outer end of the arm. A T-shaped finger 71 projects from the upper end of plate 70 oppositely to arm 67. A pin 72 is secured through the lower end of plate 70 and extends loosely through an opening 73 in member 74 of a movable switch arm 75. Member 74 is conveniently formed of strip metal and has its upper end slotted and loosely inserted beneath the head of the T-element 71 to permit of relative rocking movement between member 74 and element 71. A compression coil spring 76 is disposed about pin 72 and confined between a flanged collar 77 seating against the outer face of member 74 and an abutment member 78 of known type, in the form of a slotted locking member which engages into a circumferential groove in the pin. Arm 75 comprises a lower member 79, conveniently in the form of a strip of fiber, riveted or otherwise suitably secured to member 74. A bridging contact member 80 is suitably mounted on the lower end of member 79 for limited rocking movement on an axis extending transversely thereof. The contact member 80 carries two contact points 81 disposed for contact with points 82 of cooperating contact members 83 and 84, when the switch arm is in switch closing position. Members 83 and 84 are mounted on a supporting plate 85 of insulating material suitably secured to plate 7 and projecting downward therefrom. Binding posts 86 and 87 are suitably secured to the contact members 83 and 84, respectively, and project forwardly from the supporting plate 85.

A suitable electrical connecting device 85a, in the form of a plug socket of known type, is mounted in a suitable manner in the lower portion of casing 1 adjacent and below the insulating supporting plate 85. An electrical cord or cable 88 extends into casing 1 through a suitable opening in the side wall thereof adjacent socket 85a, and is secured by a clamping device 89 of suitable type. This cord contains two wires 90 and 91 which may be connected into the local or house circuit in a suitable manner, as by means of a plug cap of known type cooperating with a plug socket member of the same general type as member 85a. The motor 11, for driving the gear train 12 and the timing mechanism, is, as previously noted, of known type and includes a field winding or coil 95 (Fig. 6). The member 85a is intended for reception of the contact prongs of a plug cap of known type (not shown) attached to one end of a cord 98 (Figure 2) which extends into casing 1 through the same side thereof as cord 88. This provides simple and efficient means for establishing electrical connections between the control switch and a motor of the controlled mechanism, such as an electrical refrigerator.

Wire 91 of cord 88 is connected to one terminal of member 85a, the other terminal of which is connected by a lead 99 to contact member 84. Wire 90 of cord 88 is connected to the other contact member 83, one end of the field winding of motor 11 is connected to contact member 84, and the other terminal of the field winding of motor 11 is connected by a lead 101 to the terminal of member 85a to which wire 91 is connected. It will be seen that, when switch arm 75 is in closed position, and the prongs of the plug cap are inserted into plug socket member 85a, the circuit of the field winding of motor 11 is closed and this motor is continuously driven, and the circuit of the motor of the controlled mechanism is conditioned for operation of this latter motor, and that the circuits of both motors are opened when the switch arm 75 is in the open position of Fig. 4. These connections are illustrated and described in detail in my copending application, above referred to, and need not be further explained here.

Switch arm 75 is yieldingly urged into switch opening position by a wire spring 105 coiled about stud 68, one arm of this spring bearing against the inner face of plate 70 adjacent the lower end thereof, and the other arm of this spring bearing against a tab 106 struck from plate 7 and projecting rearwardly therefrom. Tab 106 also serves as a stop element for limiting the opening movement of arm 75, as shown in Figure 4.

Arm 67 is provided, at its inner end, with a notch 107 defining a latch element 108 adapted for cooperation with latch element 37 of arm 36 of lever 17, and is further provided, at its lower edge, with a notch forming an inclined edge 109. A switch setting pawl 110 is pivoted at its lower end, at 111, on the inner end of the setting lever 39. This pawl is provided, at its upper end, with a relatively long finger 112 and a short finger 113, the latter being disposed to contact edge 109 of arm 67 upon upward movement of pawl 110, when lever 17 is in its normal lowered position. Finger 112 extends into the pocket defined by element 38 of arm 36 and plate 7, and is yieldingly held in contact with the lower edge of arm 36 by a wire spring 115 disposed about tab 57, one arm of which spring contacts the lower edge of a tab 116 projecting rearwardly from the outer edge of pawl 110, the other arm of spring 115 engaging about sleeve 40.

Setting lever 39 is provided, at its outer end, with a rearwardly extending tab 120 which projects through an opening 121 in plate 7 into a coin chute 123 secured to the back of plate 7 (Fig. 5), the tab 120 extending across the chute from front to back thereof so as to intercept a coin passing through the chute. Coin chute 123 is preferably flared at its upper end, as shown, and is disposed in register with slot 124 of a plate 125 (Fig. 3) suitably secured to the top wall of casing 1. The coin chute is of suitable size for reception of 25¢ pieces or quarters, and shaped to direct an inserted coin into contact with tab 120, upon which the coin rests edgewise so as to be disposed mainly above tab 120 and confined between this tab and the remote side wall of chute 123.

An operating lever 128 (Fig. 5) is pivoted at one end on the front of supporting plate 7. At its other end lever 128 is provided with a rearwardly projecting pin 130 (Fig. 4) which projects through an arcuate slot 132a intersecting coin chute 123, this slot being aligned with a similar slot 132 in plate 7. An operating rod 133 (Figure 5) is suitably attached adjacent its lower end to lever 128. The other end of rod 133 extends into an elongated button 135, slidable through the top wall of casing 1 and provided at its lower end with a flange 136 which cooperates with this wall for limiting upward movement of the rod. Lever 128 is urged upward by a wire spring in a known manner.

In Figure 4, pointer 29 is at the zero position on scale 65, gear 24 is locked against rotation by contact of pin 61 with pin 60, and lever 17 has been raised by the planetary action of pinion 23 travelling around gear 24, releasing arm 67 and permitting movement of switch arm 75 into its open position by spring 105.

In order to close the control switch, a coin is inserted into the coin chute 23, after which the button 35 is depressed, thus swinging the operating lever 128 downward so as to bring pin 130 into contact with the coin and force the latter downward in the chute, from the lower end of which it passes through a slot 9a in member 9 into the coin receptacle. This downward movement of the coin swings the outer end of setting lever 39 downward since the coin rests upon tab 120 of lever 39, as previously stated, with resulting upward movement of the inner end of this lever and turning movement of the setting pawl 43 in a clockwise direction as viewed in Figure 4. Tab 46 of pawl 43 is moved into position in advance of a tooth of wheel 27, and immediately thereafter the tooth defined by tabs 47 of the pawl 43 is disengaged from the wheel 27. This permits slight clockwise rotation of the controlling and setting assembly, and return of lever 17 to its normal lowered position, by the action of tension spring 33. Finger 113 of pawl 110 then contacts edge 109 of arm 67 so as to move this arm upward and, at about the same time, finger 48 of pawl 43 contacts the following edge of a tooth of wheel 27 so as to rotate the same in a clockwise direction. In the continued upward movement of pawl 110, arm 67 is raised, thus moving the switch arm 75 into switch closing position, and the inner end of arm 67 contacts the lower end of arm 36, swinging lever 17 a short distance in a counterclockwise direction against the tension of spring 33 until latch element 108 of arm 67 passes above latch element 37 of arm 36, at which time lever 17 is again returned to its lowermost position with a snap action by tension spring 33 so as to engage latch element 37 beneath latch element 108, thus locking the switch arm 75 in closed position. If thereafter lever 39 is actuated to move pawl 110 upward, arm 67 may be raised slightly, this being permitted by the loose and resilient connections between arms 67 and 75, previously referred to, but arm 67 is retained in switch closing position so long as lever 17 remains in its lowered position. This closes the circuit of motor 11, setting the meter in operation, and conditions the circuit of the motor of the controlled mechanism for operation.

When the coin passes beyond tab 120 of lever 39, this lever is returned to its normal position by tension spring 56. In the return movement of the lever 39, the tabs 47 of pawl 43 engage between two adjacent teeth of wheel 27, advancing it the remaining one-half of a space of the scale 65, and then locking the wheel 27 against rotation. In this manner, the wheel 27 is advanced one full space of the scale upon insertion of a coin. Likewise, the wheel 27 is advanced a corresponding distance for the insertion of each additional coin, it being noted that the scale 65 is provided with twenty-two spaces and the mechanism is intended for reception of twenty-two coins inserted one immediately after the other. It is possible, however, to advance the dial a further distance of one space before pin 60 thereof contacts pin 61 of gear 24, after twenty-two coins have been inserted, so that the maximum capacity of the meter, at a single setting thereof, starting at zero, is twenty-three coins.

After closing of the control switch in the manner described, this switch will remain closed for a predetermined period of time, depending upon the number of coins inserted, this number and the time during which the switch will remain closed being indicated by the pointer 29 and scale 65. When the pointer 29 again reaches the zero position on the scale 65, gear 24 will be locked against rotation by contact of pin 61 of this gear with pin 60 of wheel 27, at which time pinion 23 will travel around gear 24 in a counterclockwise direction, thus raising lever 17 and disengaging latch element 37 of arm 36 from latch element 108 of arm 67, releasing the latter arm and permitting of switch arm 75 being moved into open position by spring 105.

The clockwork 10 includes, as a part of the supporting structure thereof, a plate 137 disposed in parallel spaced relation to the main supporting plate 7 of the mechanism. A bracket 138, shaped as shown in Figures 5, 9 and 10, is secured to the back of plate 137 and projects therefrom toward chute 123. This bracket is offset rearwardly from plate 137 and supports a gear wheel 139 which meshes with a pinion 140 secured to shaft 141 on which the pinion 13 is secured. Gear wheel 139 also meshes with a pinion 142 secured on a shaft 143 rotatably supported in bracket 138, and in a bracket 144 struck from a plate 145 at the front of clockwork 10, from which plate bracket 144 projects rearwardly as shown. Plate 145 supports, at the front face thereof, a clock dial 146 disposed in alignment with a window 147 in the front wall of casing 1, as shown in Figure 1, so as to be viewed through this window, the numbers of this dial being arranged reversely to the order in which the numbers ordinarily appear on a clock dial.

A minute hand 148 is suitably attached to the forward end of the hub of a pinion 149 disposed at the back of a gear 150, to the forward end of the hub of which is suitably attached an hour hand 151, the hub of gear 150 projecting through plate 145 and dial 146, and the hub of pinion 149 projecting through and forwardly beyond the hub of gear 150. Pinion 149 is frictionally clutched to shaft 143 by clutch means 152 of known type. Pinion 149 and gear 150 have relative rotation, and are geared together through a gear wheel 153 rotatably mounted on the back of plate 145 and meshing with pinion 149, and a pinion 154 rigid with gear wheel 153 and meshing with gear wheel 150. The gear ratio between pinion 149 and gear wheel 150 is 1 to 12, so that the hour hand 151 moves through one major space of the dial for each complete rotation of minute hand 148, as in clocks of conventional type. The manner of securing the hands 148 and 151 upon the hubs of pinion 149 and gear wheel 150, respectively, is that ordinarily employed in clock construction, and clutch 152 is also of a type commonly used in clocks of ordinary construction.

Gear wheel 153 also meshes with a relatively large gear wheel 154a secured on a shaft 155, rotatably mounted in plate 145 and a bracket 156 secured to the back of this plate. The gear ratio between pinion 149 and gear 154a is 1 to 12, so that gear 154a is turned through one complete rotation in a counterclockwise direction, as viewed in Figure 6, for each twelve complete rotations of pinion 149 and minute hand 148. A bevel gear 157 is mounted on shaft 155 and attached to gear wheel 154a at the back thereof and for rotation therewith. The upper end of bracket 156 is bent downward to provide a forwardly extending flange 158, through which is slidably mounted a setting rod 159 upon which is secured a beveled setting pinion 160, disposed to mesh with bevel gear 157 when rod 159 is depressed. This rod is normally held in raised position by a coil compression spring 161 disposed about the lower portion of the rod and confined between pinion 160 and flange 158. The lower end of the rod is slightly spread or enlarged to prevent upward movement of the rod beyond the position shown in Figure 6. A sleeve 162, provided at its upper end with a knurled head 163, is slidable through the top wall of casing 1 and has a friction fit over the upper portion of rod 159. This sleeve is provided, at its lower end, with two diametrically opposite notches, which receive the end portions of a pin 164 secured through rod 159, for establishing a positive connection between the sleeve and the rod. By depressing sleeve 162, rod 159 is moved downward so as to bring pinion 160 into mesh with bevel gear 157, which may then be rotated in proper direction and to desired extent by turning sleeve 162, thus imparting similar and equal rotation to gear wheel 154a.

A pintle rod 165 has its rearward end suitably secured in bracket 138, from which it extends forwardly above gear wheel 154, the forward end of this rod seating in a recess in vertical arm 166a of an L-shaped bracket 166 secured to the rear face of plate 145, adjacent the top thereof, the upper horizontal arm 166b of this bracket slidably receiving and guiding the setting rod 159. Rod 165 passes through the lower ends of two tabs 167 formed integrally with, and depending from the outer end of, an arm 168, at the front and the rear edges thereof. Arm 168 is thus rockably mounted on rod 165, and this arm is yieldingly urged in a clockwise direction, as viewed in Figure 6, by a tension coil spring 169 disposed about rod 165, one end of this spring engaging over the upper edge of bracket 138 (Figure 5), and the other end of this spring engaging about the forward edge of the rearward tab 167.

A shaft 170 is mounted in plate 137a of the clock-work and plate 145, adjacent the upper edges thereof, and receives a sleeve 171 which is mounted on shaft 170 for relative turning movement and is slidable lengthwise of the shaft. Sleeve 171 is provided at its rearward end with a cam 172 having a rearwardly extending hub 173 in which is secured a screw 174. This screw is engaged by one end of a coil spring 175, disposed about shaft 170 and confined between hub 173 of the cam and plate 137a, with one edge of which the other end of the spring engages. This spring 175 acts under tension to yieldingly urge sleeve 171 and cam 172 toward plate 145, and also acts by torsion to yieldingly urge the cam 172 in a counterclockwise direction as viewed in Figure 8. A hook member 176 is secured to arm 168, adjacent the inner end thereof and depends therefrom, the bill portion of this hook member being disposed to engage beneath shaft 170 and limit upward movement of the inner end of arm 168, as in Figure 6. A button 177 is slidable through the top wall of casing 1 and contacts the portion of hook member 176 secured through arm 168, this button being provided at its lower end with a flange, as indicated in Figures 6 and 8, which flange is effective to prevent withdrawal of the button from the casing.

A trip arm 178 is secured to the forward end of sleeve 171, and extends downward therefrom so as to be disposed in the path of travel of a trip pin 179 secured to gear wheel 154a and projecting rearwardly therefrom, when sleeve 171 is in its forward position. Upward movement of arm 178, under the influence of spring 175, beyond the position of this arm shown in Figure 8, is prevented, by a suitably disposed stop pin 180 secured to plate 145 and projecting rearward therefrom.

A buzzer arm 181 is pivoted, by means of tabs 182 integral therewith, upon a post 183 of the clockwork 10. Arm 181 is provided, at the inner end thereof, with an upwardly projecting flange 184, and is urged upward by a wire spring 185 disposed about post 183, one end of this spring being engaged over the rearward edge of arm 181 and extending therebeneath, the other end of the spring contacting the forward portion of the casing of motor 11, or any other convenient element of the clock-work. The arm 181 is further provided with an arcuate extension 186, which extends beyond post 183 oppositely to the arm and is disposed substantially concentric with and in proximity to the outer portion of the casing of motor 11, in which portion of the casing field coil 95 of the motor is disposed, as shown in Figure 6. Normally, cam 172 is in contact with the upper edge of flange 184 so as to depress the inner end of arm 181 and hold element 186, which is formed of magnetic material, outwardly away from the casing of motor 11 a proper distance to prevent appreciable vibration of element 186 by the magnetic field produced by flow of alternating current through the field coil of the motor. By turning cam 172 a short distance in clockwise direction, as viewed in Figures 6 and 8, from the position of Figure 8 into the position of Figure 6, shoulder 172a of the cam 172 is moved outwardly beyond flange 184 of arm 181, permitting the latter to be raised by spring 185 and positioning buzzer element 186 in close proximity to the circumferential wall of the motor casing, as in Figure 6. When thus disposed, element 186 is within the magnetic field of coil 95 and is rapidly vibrated, functioning as a buzzer and producing an audible signal. This turning of cam 172, for releasing arm 181 is effected by means of trip pin 179 contacting trip arm 178 in the counterclockwise rotation of gear 154, as viewed in Figure 6, at which time the parts of the arm release mechanism are disposed as shown in this figure. When pin 179 is in contact with trip arm 178, as shown, hands 148 and 151 are both at zero position on the clock dial 146.

In order to stop operation of the alarm, setting arm 168 is moved downward from the position of Figure 6, by means of button 177, so as to bring a setting and cam finger 188, depending from the inner end of arm 168, into contact with arm 181 so as to depress the inner end thereof and move flange 184 downward beyond cam 172. Finger 188 is inclined upward and rearward toward arm 168, as shown in Figure 7, and in its downward movement contacts cam 172 and shifts the same rearwardly sufficiently so that arm 178 clears pin 179. As soon as the trip arm clears the trip pin, cam 172 is turned by spring 175 in counterclockwise direction, as viewed in Figures 6 and 8, through a distance limited by contact of arm 178 with stop pin 180, after which the inner end of arm 181 is held depressed by cam 172 so as to hold the buzzer element 186 in its outer inoperative position, as shown in Figure 8. The slight counterclockwise movement of trip arm 178, with cam 172 and sleeve 171, disposes the lower portion of this arm in back of trip pin 179 in overlying relation thereto. Upon release of setting arm 168, this arm and button 177 are returned to their normal positions, and cam 172 and sleeve 171 are returned to their normal forward position by the spring 175, at which time trip arm 178 is in contact with the rearward end of pin 179 and is under slight tension. When it is desired to set the signal or alarm means for operation at the end of a predetermined time, gear 154a is rotated in proper direction to bring hands 148 and 151 of the timing means into zero position on the dial, thus bringing the trip pin 179 into zero position, shown in Figure 6, after which setting arm 168 is momentarily depressed so as to stop operation of the buzzer, as above explained. After release of the arm 168, trip arm 178 and cam 172 occupy the positions shown in Figure 8, and trip pin 179 remains in zero position, arm 178 being placed under tension by the forward movement of cam 172 and sleeve 171. Setting gear 154 is then turned in clockwise direction, as viewed in Figure 8, so as to turn the hands 148 and 151 in counterclockwise direction over the dial, as viewed in Figure 1, setting the timing mechanism for operation of the alarm at the desired time. When pin 179 passes from beneath arm 178, this arm is moved forward, by its resiliency, so as to be disposed in the path of travel of the pin in its return movement. Assuming that the timing mechanism has been set for operation of the alarm at the end of 46½ minutes, as shown in Figure 1, the pin 179 will be moved a corresponding distance in clockwise direction, as viewed in Figure 8, from its zero position shown in this figure. At the end of the time for which the timing mechanism is set, pin 179 will contact trip arm 178 and move the latter in a clockwise direction, as viewed in Figure 8, thus moving cam 172 into the position shown in Figure 6 and permitting operation of the alarm, as previously described.

A gear stop pin 189, secured to dial plate 145 and projecting rearwardly therefrom, is disposed in the path of travel of the forward end of trip pin 179, which pin projects forwardly of gear wheel 154a, as shown in Figure 11, so that pin 179 contacts pin 189 when it reaches zero position. This prevents rotation of gear wheel 154a in counterclockwise direction, as viewed in Figure 8, in which direction this gear wheel is driven by the clockwork, beyond the position shown in Figure 8. Momentarily depressing setting arm 168 raises the buzzer or alarm element 186 into inoperative position, as previously described, and the buzzer cannot be again released for operation so long as gear wheel 154 remains in zero position. This effectively prevents operation of the alarm except at the end of a predetermined time for which the timing mechanism may be set. When the gear wheel 154a is thus held against rotation by the clockwork, the clutch 152 permits slippage between shaft 143 and pinion 149 in a known manner, the clockwork continuing to be driven by motor 11 thereof.

It will be appreciated by those skilled in the art that changes in construction and arrangement of parts of my invention may be resorted to without departing from the field and scope of the same, and I intend to include all such variations, as fall within the scope of the appended claims, in this application in which the preferred form only of my invention is disclosed.

What I claim is:—

1. In combination, a synchronous electric motor, signal means comprising a pivoted arm yieldingly urged toward operative position, said arm being provided at one end with a magnetic element disposed in the magnetic field of the motor to be actuated thereby, in the operative position of said arm, a cam normally disposed in rotary position to contact the other end of said arm and hold it in inoperative position with said magnetic element in inoperative position, yielding means normally holding the cam in said normal rotary position and in one axial position, a trip arm rigid with the cam and having limited turning movement in one direction for preventing turning of said cam in said direction beyond normal position, clock means, driving connections between said clock means and said motor comprising a slip clutch, a gear driven in one direction by the clock means, a pin projecting from said gear, said trip arm being normally disposed in the path of travel of said pin and cooperating therewith for turning the cam and releasing the arm of said signal means, means for rotating said gear in the other direction and thereby setting said clock means correspondingly to the extent of such rotation of said gear, means for preventing rotation of said gear in said one direction beyond tripping position, and means for turning said signal arm into inoperative position and shifting the cam axially out of normal position, thereby releasing said trip arm from said pin.

2. In combination, a synchronous electric motor, signal means comprising a pivoted arm provided at one end with a magnetic element positionable in the magnetic field of said motor to be actuated thereby, when said arm is turned in one direction, means yieldingly urging said arm in said direction, means for turning said arm in the other direction and for holding said element in inoperative position, clock means comprising a dial graduated from an initial point in hours and minutes and an hour hand and a minute hand movable over said dial, driving connections between said clock means and said motor comprising a slip clutch, a member driven in one direction by said clock means, means for moving said member in the opposite direction and correspondingly setting the clock means, trip means actuated by said member in its travel in said one direction for releasing said arm when said member reaches a position corresponding to initial position of said hands on said dial, means preventing travel of said member beyond such position, and means for releasing said trip means and returning said arm to position to hold said magnetic element in inoperative position.

3. In combination, a synchronous electric motor, signal means comprising a vibratable magnetic element disposable in the magnetic field of the motor to be actuated thereby, means normally holding said element in inoperative position, clock means comprising a dial and two hands movable over the dial at different uniform rates in the relative ratio of one to twelve, said dial being graduated to indicate hours and minutes from a zero point thereon, driving connections between said clock means and said motor comprising a slip clutch, a gear driven in one direction by the clock means, means for rotating said gear in the other direction for setting said clock means, means for releasing said magnetic element and moving it into operative position when said gear has been turned by said clock means into such position that both of said hands are at zero position on the dial, and means for holding said gear against turning in said one direction beyond such position and for preventing movement of said hands for maintaining them in zero position.

4. In combination, a synchronous electric motor, signal means comprising a vibratable magnetic element disposable in the magnetic field of the motor to be actuated thereby, means normally holding said element in inoperative position, clock means comprising a dial and two hands movable over the dial at different uniform rates in the relative ratio of one to twelve, said dial being graduated to indicate hours and minutes from an initial point thereon, driving connections between said clock means and said motor comprising a slip clutch, a rotatable member positively geared to said hands and driven by said clock means in one direction, means for rotating said member in the other direction for setting said clock means, means for releasing said magnetic element and moving it into operative position when said member has been turned by said clock means into such position that both of said hands are at the initial point on the dial, and means for preventing turning of said member in said one direction beyond such position thereby maintaining said hands in said initial position.

ERNEST H. THOMPSON.